United States Patent [19]

Tanaka et al.

[11] Patent Number: 4,717,858
[45] Date of Patent: Jan. 5, 1988

[54] THIN FILM ELECTROLUMINESCENCE DEVICE

[75] Inventors: Koichi Tanaka; Takashi Ogura, both of Tenri; Koji Ianiguchi, Nara; Akiyoshi Mikami, Yamatotakada; Masaru Yoshida, Nara, all of Japan

[73] Assignee: Sharp Kabushiki Kaisha, Osaka, Japan

[21] Appl. No.: 819,217

[22] Filed: Jan. 15, 1986

[30] Foreign Application Priority Data

Jan. 22, 1985 [JP] Japan .................. 60-10074
Mar. 28, 1985 [JP] Japan .................. 60-68326
Jun. 28, 1985 [JP] Japan .................. 60-142749
Jul. 9, 1985 [JP] Japan .................. 60-151706

[51] Int. Cl.$^4$ .................. H05B 33/18; H05B 33/22
[52] U.S. Cl. .................. 313/503; 313/509
[58] Field of Search .................. 313/503, 509

[56] References Cited

U.S. PATENT DOCUMENTS 3,283,194 11/1966 Rulon .................. 313/509
4,213,074 7/1980 Kawaguchi et al. .................. 313/509
4,365,184 12/1982 Higton et al. .................. 313/503
4,442,377 4/1984 Higton et al. .................. 313/503
4,599,539 7/1986 Ishizuka et al. .................. 313/503 X

OTHER PUBLICATIONS

"Activators & Co-Activators in Calcium Sulfide Phosphors" By W. Lehmann, *Journal of Luminescence*, (1972), North-Holland Pub. Co., pp. 87 and 100.
"Cathodoluminescence of CaS:Ce$^{2+}$ and CaS:Eu$^{2+}$ Phosphors" By W. Lehmann et al., *Luminescence of Solid Solutions*, vol. 118, No. 3, Mar. 1971, pp. 477–482.

*Primary Examiner*—Palmer C. DeMeo
*Attorney, Agent, or Firm*—Cohen, Pontani & Lieberman

[57] ABSTRACT

A thin film electroluminescence device comprising an electrode layer, an emitting layer and an electrode layer formed on a substrate one over another, and an insulating layer optionally interposed between the three layers, the emitting layer being made of CaS serving as a host material and doped with Eu$^{2+}$ providing luminescent centers.

The emitting layer comprising a novel combination of host material and luminescent center produces a red electroluminescence with a high brightness.

3 Claims, 6 Drawing Figures

THIN FILM ELECTROLUMINESCENCE DEVICE

BACKGROUND OF THE INVENTION

1. Field of the Invention

The present invention relates to a thin film electroluminescence device for emitting an electroluminescence (EL) in response to the application of an electric field, and more particularly to a red electroluminescence device comprising a novel combination of host material and luminescent centers.

2. Description of the Prior Art

Since a technique was developed for giving a bright electroluminescence by applying an a.c. electric field to an emitting layer of zinc sulfide (ZnS) doped with an active substance, various investigations have been made on electroluminescence. A thin film electroluminescence (TFEL) device of double-insulated structure is already known which comprises an emitting layer of ZnS, ZnSe or the like doped with Mn as an active substance for providing luminescent centers, a pair of insulating layers sandwiching the emitting layer, and a pair of electrodes sandwiching the assembly and including at least one transparent electrode. This device is now commercially available as a lightweight thin EL display panel because of its high brightness and prolonged life characteristics. Since stable hysteresis (memory effect) can be imparted to the luminescence brightness-applied voltage characteristics of the device by controlling the amount of Mn to be added to the emitting layer, research is under way for its application to the terminals for a multi-purpose input-output devices.

However, there are limitations to the actual use of the above-mentioned TFEL device since the device produces an orange luminescence (585 nm in peak wavelength) only which is specific to the Mn dopant for providing luminescent centers. Presently, therefore, it is strongly desired to realize multicolor luminescence by TFEL devices and expand the market primarily through use in multicolor displays. For multicolor luminescence, LUMOCEN device is proposed wherein luminescent centers of rare-earth fluoride are incorporated in the host material of a ZnS emitting layer in place of Mn (D. Kahng, Appl. Phys. Lett., vol. 13, pp. 210-212, 1968). Research is made on samarium fluoride ($SmF_3$) and europium fluoride ($EuF_3$) for use as active substances for red luminescent centers. Nevertheless, rare-earth ions are generally large in ionic radius (at least about 1.0 Å) and are trivalent ($Sm^{3+}$, $Eu^{3+}$), so that when such ions are added to the ZnS host material, it is difficult to replace Zn lattice points with ions, or the replacement, if possible, impairs the crystallinity of the ZnS host material, owing to the difference in ionic radius (0.75 Å for $Zn^{2+}$) as well as in the number of valence electrons (Zn is divalent). This impedes the travel of conduction electrons participating in luminescence, resulting in inefficient luminescence or heat generation of the device. Accordingly, research has been started on TFEL devices wherein the host material is calcium sulfide (CaS), a compound of Ca having an ionic radius (1.000 Å) approximately equal to those of rare-earth elements, as described generally, for example, in Appl. Phys. Lett., vol. 45, pp. 960-961, 1984, etc. However, a satisfactory luminescence brightness still remains to be achieved.

SUMMARY OF THE INVENTION

The present invention provides a thin film electroluminescence device comprising an electrode layer, an emitting layer and an electrode layer formed on a substrate one over another, and an insulating layer optionally interposed between the three layers, the emitting layer being made of CaS serving as a host material and doped with $Eu^{2+}$ providing luminescent centers.

The TFEL device of the present invention produces a red electroluminescence with a high brightness.

The host material is doped with $Eu^{2+}$ preferably in an amount of 0.05 to 0.8 atm. %, more preferably 0.08 to 0.5 atm. %. The host material is oriented preferably in the direction of (222) axis. This orientation assures electroluminescence with a still higher brightness. When the insulating layer is formed from a nitride over the region thereof in contact with the emitting layer, the degree of variation in the luminescence characteristics which occurs with lapse of time can be diminished. It is desirable that the nitride be $Si_3N_4$, AlN or BN.

DESCRIPTION OF THE PREFERRED EMBODIMENTS

1. Structure of TFEL device

Figure 1:
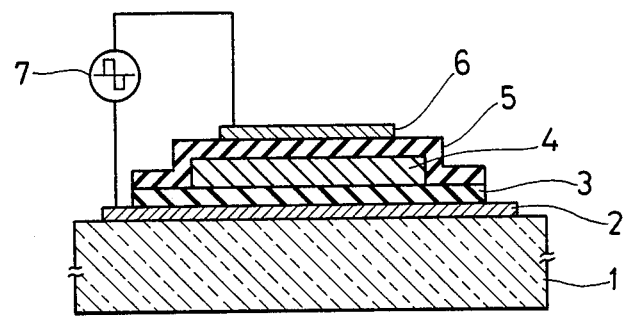
FIG. 1 is a diagram showing the structure of a TFEL device embodying the present invention.

FIG. 1 shows the structure of a TFEL device embodying the present invention.

A substrate 1 is formed with a transparent electrode 2 thereover and a first insulating layer 3 on the electrode 2. Formed on the first insulating layer 3 is an emitting layer 4, which is covered with a second insulating layer 5. A rear electrode 6 is provided on the layer 5. An a.c. power supply is connected to the transparent electrode 2 and the rear electrode 6 to drive the device. One or both of the first and second insulating layers can be dispensed with.

(a) The substrate 1 is made of alkali-free glass #7059 (product of CORNING GLASS WORKS) or #LE-30 (product of HOYA GLASS CORP.) having a plate thickness of 1.2 mm. Preferably, the glass plate is in the range of 0.1 to 5.0 mm in thickness.

(b) The transparent electrode 2 is an $In_2O_3$ film having a thickness of 140 nm and formed on the substrate 1 by sputtering. Preferably, the film thickness is in the range of 100 to 600 nm. The film may be formed by resistive heating evaporation, electron beam evaporation or ion plating.

(c) The rear electrode 6 is formed by depositing aluminum on the second insulating layer 5 to a thickness of about 200 nm by vacuum evaporation. It is desired that the film thickness be in the range of 100 to 400 nm.

(d) The emitting layer 4, one of the characteristics of the present invention, is made of CaS serving as a host material and doped with $Eu^{2+}$ providing luminescent centers, as will be described below in detail.

The emitting layer 4 can be fabricated by molding pellets of EuS-doped CaS under pressure and depositing the material on the insulating layer 3 by electron beam evaporation using the pelletized CaS as the evaporation source. Also usable is other film forming method, such as sputtering, CVD process, ALE (atomic layer epitaxial) process or MBE (molecular beam epitaxial) process.

The $Eu^{2+}$ concentration of the emitting layer 4 is 0.3 atm. % based on CaS. The $Eu^{2+}$ concentration is preferably 0.05 to 0.8 atm. %, more preferably 0.08 to 0.5 atm. %, based on CaS. $Eu^{2+}$ can be incorporated in an amount of 0.05 to 0.8 atm. % into the emitting layer 4 by using CaS pellets containing 0.01 to 2.0 mole % of a Eu compound added thereto, as the evaporation source. Examples of useful Eu compounds other than EuS are $Eu_2O_3$, $EuCl_3$ and $EuF_3$.

The host material of the emitting layer 4 is oriented in the direction of (222) axis.

The thickness of the emitting layer 4, which is 1.5 μm, is suitably in the range of 0.5 to 5.0 μm.

(e) The first insulating layer 3 comprises an $SiO_2$ film having a thickness of 50 nm and formed on the electrode 2, and an $Si_3N_4$ film having a thickness of 150 nm and formed on the $SiO_2$ film to adjoin the emitting layer 4. Preferably, the $SiO_2$ film is 10 to 500 nm and the $Si_3N_4$ is 30 to 1000 nm in thickness.

The second insulating layer 5 comprises an $Si_3N_4$ film having a thickness of 110 nm and formed on the emitting layer 4, and an $Al_2O_3$ film having a thickness of 90 nm and formed on the $Si_3N_4$ to adjoin the electrode 6. It is desirable that the $Si_3N_4$ film and $Al_2O_3$ film be 20 to 700 nm in thickness.

The first and second insulating films 3, 5 are formed by sputtering.

The first and second insulating layers may each comprise a single layer. The $Si_3N_4$ may be replaced by AlN or BN. These insulating layers can be formed also by electron beam evaporation.

Figure 2:
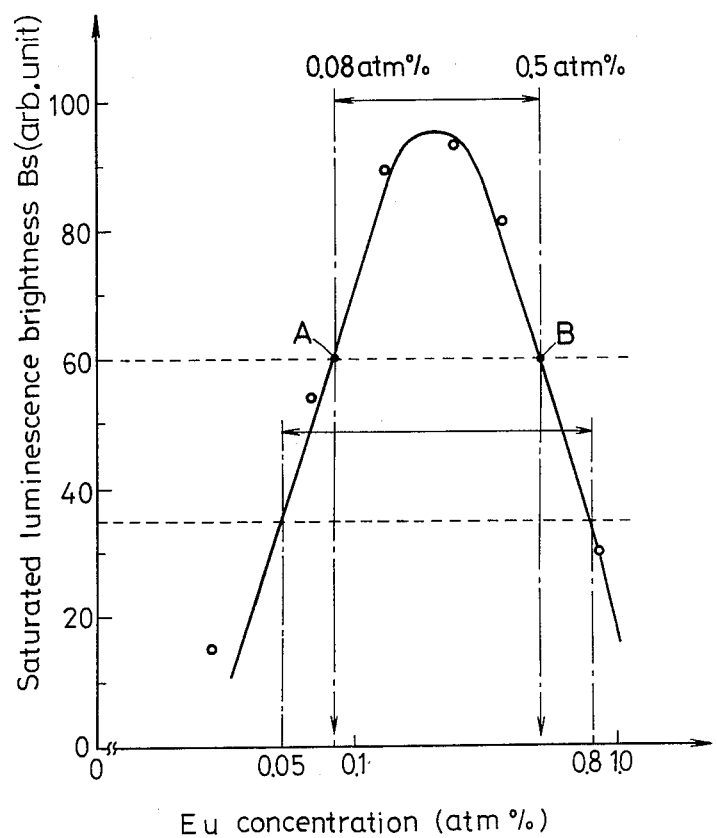
FIG. 2 is a characteristics diagram showing the relation between the saturated luminescence brightness Bs and the Eu concentration of the emitting layer of the TFEL device shown in FIG. 1.

2. Characteristics of components (a) Relation between the $Eu^{2+}$ concentration of emitting layer and luminescence brightness FIG. 2 is a characteristics diagram showing the relation between the saturated luminescence brightness Bs and the Eu concentration of the emitting layer of the TFEL device shown in FIG. 1. The diagrams reveals that with an increase in the Eu concentration of the emitting layer 4, Bs increases and then decreases. Generally, direct collision excitation, i.e., the direct excitation of the luminescent centers by hot electrons, is thought predominant in the excitation mechanism of TFEL devices. It is therefore considered that there is close correlation between the number of luminescent centes in the emitting layer 4 and the luminescence brightness. With reference to FIG. 2, the region where the saturated luminescence brightness increases with increasing Eu concentration occurs since an increase in the Eu concentration increases the number of luminescent centers, increasing the amount of luminescence due to the collision of the centers with hot electrons. When the Eu concentration is further increased, there is a range of optimum concentrations in which the luminescent centers are most efficiently excited to luminesce. A further increase in the Eu concentration beyond the optimum concentration range shortens the distance between the luminescent centers, increasing the probability (nonradiative transition probability) that the excitation energy will be consumed between the luminescent centers by a nonluminescence process and resulting in a marked decrease in Bs. Accordingly, when the Eu concentration of the emitting layer 4 is controlled to the above-mentioned range as shown in FIG. 2, the TFEL is adapted to luminesce with a fully useful brightness.

Figure 3:
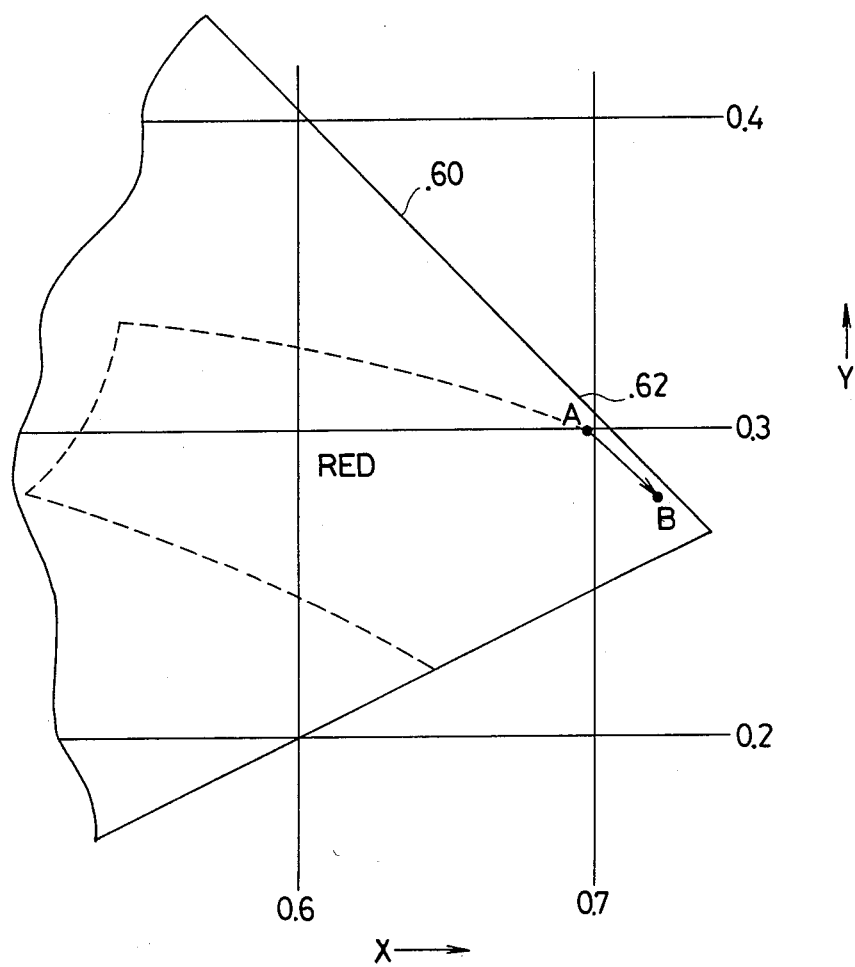
FIG. 3 is a CIE standard chromaticity diagram showing the position of the color of luminescence of the TFEL device of FIG. 1.

FIG. 3 is CIE standard chromaticity diagram showing the position of the color of luminescence of the TFEL device of FIG. 1 with the Eu concentration at point A (0.08 atm. %) or point B (0.5 atm. %) shown in FIG. 2. As the Eu concentration increases from 0.08 atm. % to 0.5 atm. %, the chromaticity shifts from point A to point B. Since the Eu luminescence of the CaS emitting layer 4 is due to the d-f allowed transition of $Eu^{2+}$ ions of $^7F(4f^65d) \rightarrow {}^8S_{7/2}$ (4f$^7$), the luminescent centers are greatly affected by the neighboring crystal field. Accordingly, a variation in the Eu concentration of the emitting layer 4 varies the distance between the luminescent centers and also changes the state of crystal field of the CaS host material, whereby the color of luminescence is presumably changed. It is therefore possible to realize a red EL device having a desired color of luminescence between point A and point B in the chromaticity diagram by controlling the Eu concentration.

Figure 4:
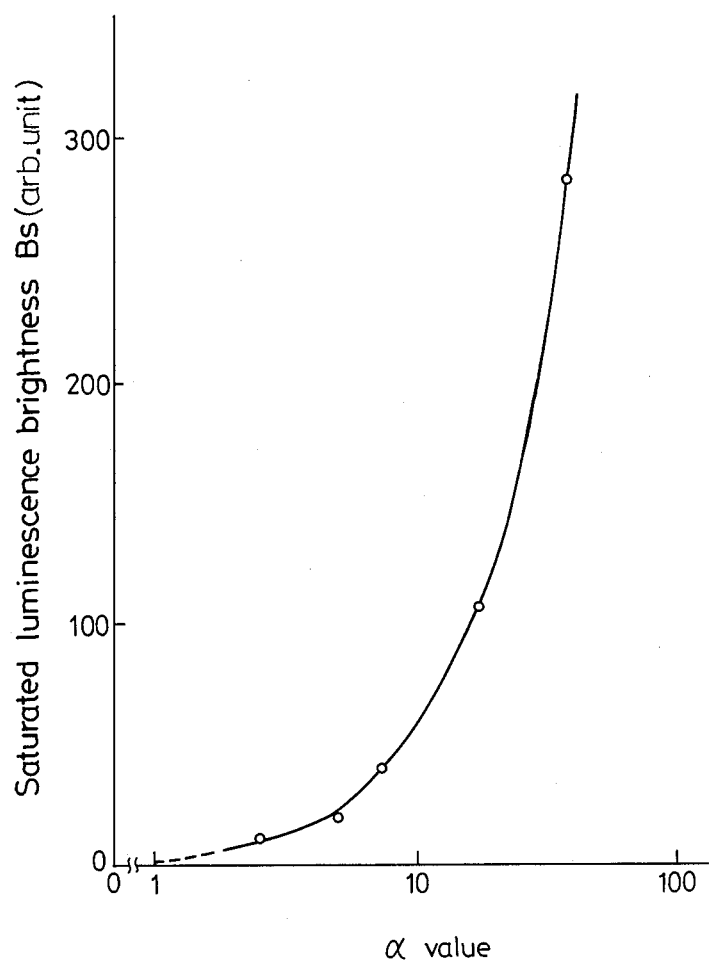
FIG. 4 is a characteristics diagram showing the relation between the saturated luminescence brightness Bs of the TFEL device of FIG. 1 and the orientation in the direction of (222) axis.
Figure 5:
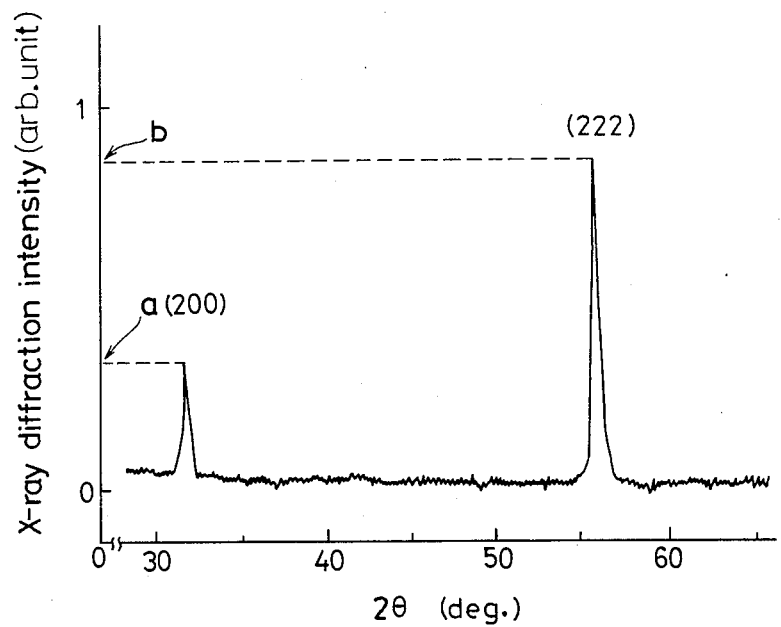
FIG. 5 is a diagram showing the x-ray diffraction pattern of the emitting layer of the same device.

(b) Relation between the orientation of the emitting layer host material and the luminescence brightness FIG. 4 is a characteristics diagram showing the relation between saturated luminescence brightness Bs of the TFEL device of FIG. 1 and α value indicative of the orientation in the direction of (222) axis. FIG. 5 is a characteristics diagram showing an example of x-ray diffraction pattern of the CaS emitting layer 4 fabricated by the process described. While the x-ray diffraction pattern differs with the conditions for fabricating the CaS emitting layer (e.g. substrate temperature, kind and amount of dopant for luminescent centers, film forming method), diffraction peaks appear chiefly in (200), (220), (222) and (400) planes. Of these diffraction peaks, the peak intensities of (200) and (222) planes, which are relatively high, are expressed as I(200) and I(222) (a and b in FIG. 5), and the intensity ratio I(222)/I(200) (b/a) is defined as an α value indicating the orientation in the direction of (222) axis. FIG. 4 shows that the saturated luminescence brightness Bs greatly increases with increasing α value.

While conduction electrons need to travel in a high electric field and become hot electrons for electroluminescence, the emitting layer includes many crystal defects, lattice distortions, etc. produced during film formation, so that the electrons will not be accelerated efficiently owing to scattering or the like. This appears responsible for a reduction in the luminescence brightness.

Since the crystal structure of CaS is of the NaCl (rock salt) type, Ca and S atoms must be arranged alternately horizontally and vertically in a plane when crystals are to grow in (200) and (220) directions. This arrangement appears prone to lattice defects. On the other hand, when crystals are to grow in (222) direction, Ca planes and S planes alternate in layers, so that atoms of one kind only need to lie in a plane. This arrangement is much less susceptible to defects than when crystals grow along another crystallographic axis. For this reason, the emitting layer oriented in the direction of the (222) axis has remarkably improved crystallinity, permitting efficient acceleration of conduction electrons to give a greatly enhanced brightness Bs.

(c) Relation between the material for insulating layer and the change of luminescence brightness with time.

Figure 6:
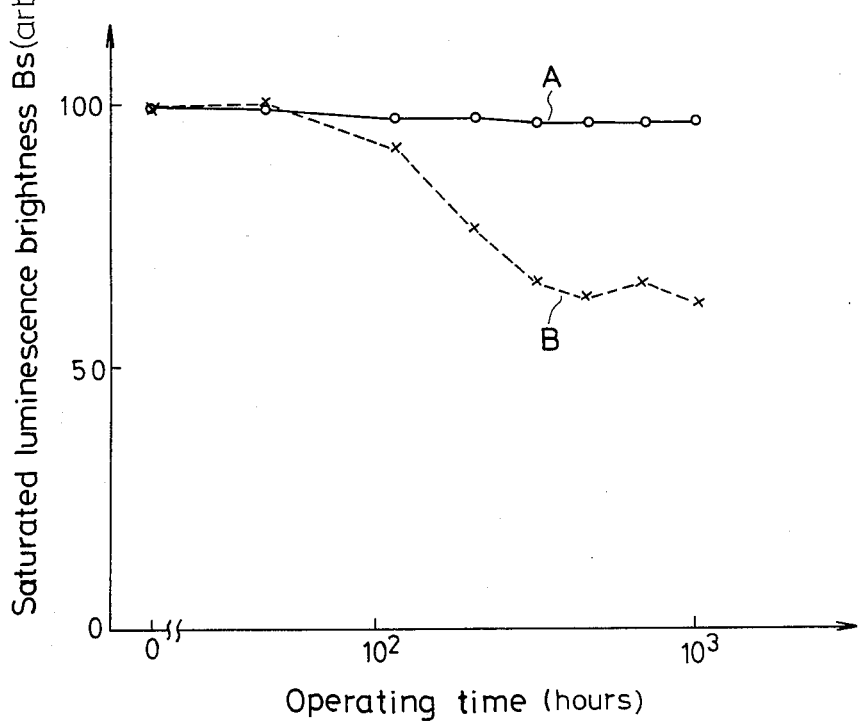
FIG. 6 is a characteristics diagram showing variations in the saturated luminescence brightness Bs with time as determined for the TFEL device of FIG. 1 and also for a conventional TFEL device including oxide insulating layers.

FIG. 6 is a characteristics diagram showing variations in the saturated luminescence brightness Bs with time as determined for the TFEL device of FIG. 1 and also for a TFEL device wherein the oxide $Y_2O_3$ conventionally used as an insulating material for TFEL devices is used for first and second insulating layers. The devices were driven by a.c. current having a frequency of 4 kHz and a pulse width of 50 microseconds. In the diagram, the characteristics of the embodiment of the invention are represented by solid line A, and those of the conventional device by broken line B. The diagram reveals that the device incorporating the conventional oxide insulating layers exhibits a marked decrease in Bs after operating for about 100 hours and about 40% reduction in brightness after operating for about 1000 hours (broken line B). On the other hand, the present device exhibits only about 4% reduction in brightness even after operating and is therefore usable without any trouble.

Generally, calcium sulfide (CaS) is liable to change into an oxide or carbonate on reacting with the moisture or carbon dioxide in air and must accordingly be stored with full care. In the case of TFEL devices including oxide insulating layers, a high voltage of about $10^6$ V/cm is applied to the component layers during the luminescence of the device, so that the emitting layer, in particular, is in an active state. If the insulating layer is made of an oxide, the oxygen in the oxide then reacts with the CaS in the emitting layer, locally forming an oxide (CaO), which impairs the characteristics of the sulfide serving as the host material. It is thought that the above reaction takes place in the vicinity of the interface between the emitting layer and the insulating layer to adversely affect the formation of interface state which is critical as the luminescing mechanism of the TFEL, consequently entailing a markedly reduced brightness with the lapse of operating time.

When the insulating layer is made of a nitride, the oxidation reaction does not occur between this layer and the emitting layer, enabling the device to retain the desired luminescence characteristics with good stability over a prolonged period of time.

While the insulating layer may be a single layer of nitride, it is possible to use a composite insulating layer comprising a multiplicity of layers of $SiO_2$, $Y_2O_3$, $Ta_2O_5$, $TiO_2$, $Al_2O_3$ or like oxide, provided that a nitride layer adjoins the emitting layer.

What is claimed is:

1. A thin film electroluminescene device comprising an electrode layer, an emitting layer and an electrode layer formed on a substrate one over another, and an insulating layer interposed between the three layers, the emitting layer being made of CaS serving as host material and doped with $Eu^{2+}$ providing luminescent centers, said host material being doped with 0.05 to 0.8 atm. percent of $Eu^{2+}$ and being oriented in a direction of the (222) axis.

2. A device as defined in claim 1 wherein the insulating layer is formed of a nitride over the region thereof in contact with the emitting layer.

3. A device as defined in claim 2 wherein the nitride is $Si_3N_4$, AlN or BN.

* * * * *